Figure 1:
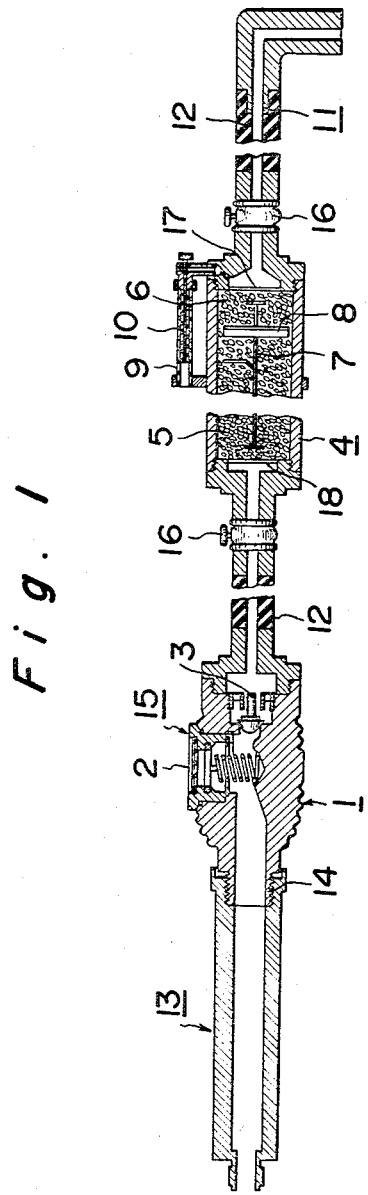

March 26, 1968  IZUMI SHIMAZAKI  3,374,780
APPARATUS FOR SUPPLYING COMPRESSED AIR
Filed Nov. 23, 1966  3 Sheets-Sheet 3

*INVENTOR*
IZUMI SHIMAZAKI

BY *Oldham & Oldham*

ATTORNEYS

United States Patent Office 3,374,780
Patented Mar. 26, 1968

3,374,780
APPARATUS FOR SUPPLYING COMPRESSED AIR
Izumi Shimazaki, 4–25–1 Nakahara, Mitaka-shi,
Tokyo, Japan
Filed Nov. 23, 1966, Ser. No. 596,518
Claims priority, application Japan, Nov. 27, 1965,
40/72,763
3 Claims. (Cl. 123—198)

This invention relates to a portable compressed air supplying apparatus utilizing an internal combustion engine, particularly for supplying safe and harmless compressed air by way of drawing gas mixture compressed in the compression stroke of a gasoline engine for an automobile, and filtrating combustible and/or harmful ingredient from the mixture.

Heretofore, automobile tire tubes have been inflated either by using an air compressor or by a portable hand-manipulating pump having an air holder. Although such pump is useful where any air compressor is not available, it requires considerable labor and time for supplying necessary air into a tube because the necessary pressure is above 22 lbs./in.$^2$ even for a normal passenger car. Furthermore, it is very difficult to supply air into a tire for heavy load trucks and buses which necessitate air pressure of about 100 lbs./in.$^2$. Under the circumstances, it has long been desired to have a portable compressed air supplying apparatus by which the necessary air can be supplied into a tire in a short time by a simple operation without necessitating troublesome manual work. Such apparatus would be very useful for unexpected necessity particularly in long distance transportation by a heavy load automobile.

For the purpose, it has been proposed to supply compressed gas drawn from a cylinder of an automobile engine, into a tire tube. Such gas is however dangerous since it is a mixture of gasoline and air which apts to explode in any failure of the apparatus. Furthermore, the rubber of the tube would be changed in quality by substances contained in the gasoline. For these reasons, such method is not actually utilized.

The theoretical critical consistency of the gasoline-air mixture in a cylinder of an internal combustion engine is known as 1.4–7.6 volume percent of gasoline, and the most effective consistency is 4.5 volume percent of gasoline. Accordingly, if such gas mixture is diluted by air taken from an intake valve of an intake pipe, opened to atmosphere, the consistency of the mixture to be supplied to the tire is lowered below said critical explosion range and is safe for inflation purposes. In the afore-mentioned known drawing mechanism, there is a possibility that gas mixture within the explosion range is charged, in case any failure occurs in the fuel system such as a carburetor, and an outer air intake valve of the intake pipe. Such would invite unexpected accident.

Particularly in case of high speed and long distance running of the automobile, considerably high frictional heat and also static electricity will be necessarily generated. In view of such unavoidable running conditions, factors of possible accident must be completely eliminated for utilization of the gas mixture injection system. Also, there exists harmful materials such as pentane, hexane, or heptane in the gas mixture. The removal of such materials is very necessary for avoiding deterioration of rubber tube by dissolution of them into the rubber.

The applicant has succeeded to provide a portable compressed air supplying apparatus which can supply safe and harmless compressed air into the tire tube in a simple way utilizing the compression stroke of an internal combustion engine, particularly an automobile gasoline engine.

The object of the present invention is to provide an apparatus for supplying compressed air into tire tubes by the utilization of the compression stroke of an internal combustion engine, comprising a compressed gas intake pipe section having an outer air inlet port and a check valve; a filtrating section having a filter chamber containing adsorbent and a flow regulator composed of a plurality of regulating plates mounted around a supporting rod at appropriate intervals in staggered relation, and a gas detector having a transparent tube filled with gas detecting agent and communicating with the end of said filter chamber; and a compressed air supply port section; these sections being connected one another by means of high pressure hoses.

Figure 2:
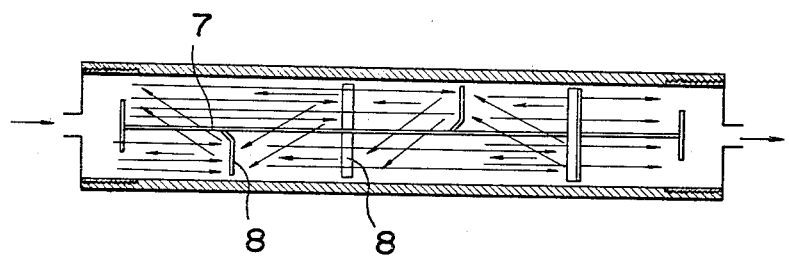
Figure 3:
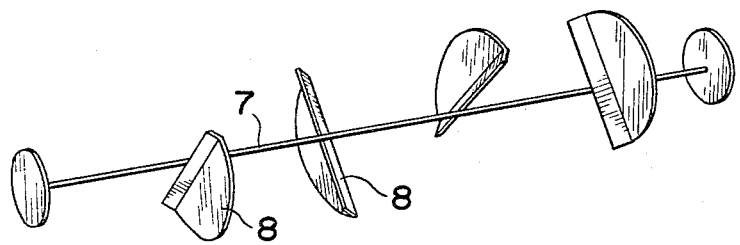
Figure 4:
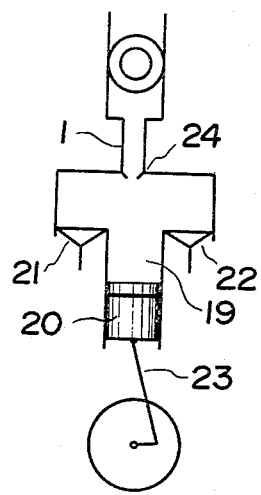
Figure 5:
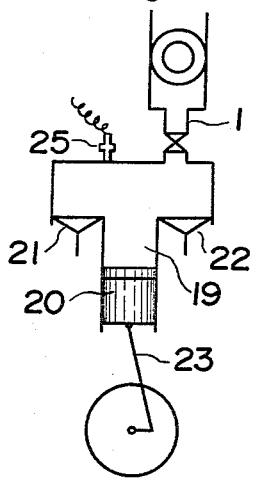

Now, the invention will be explained with a preferred embodiment illuustrated in the drawings, in which, FIGURE 1 shows an axial section of the preferred embodiment of this invention, FIGURE 2 is an explanatory diagram showing the directions of fluid flow in a filter chamber of this apparatus, FIGURE 3 is a perspective view of the flow regulator contained in the filter chamber, and FIGURES 4 and 5 are explanatory diagrams showing the mounting of the apparatus on internal combustion engines.

Referring to the drawings, a reference numeral 1 in FIGURE 1 shows a sleeve section for taking out the gas mixture from an internal combustion engine. The sleeve section 1 has an intake port 2 for outer air and a check valve 3. A reference numeral 4 shows a filter section having a filter chamber 6 and a gas detector 9. In the filter chamber 6, there is provided with a flow regulator composed of a plurality of regulating plates 8 mounted on a flow regulator composed of a plurality of regulating plates 8 mounted on a supporting rod 7, and adsorbent 5. The gas detector 9 has a transparent tube 10 filled with gas detecting agent.

11 shows a supply port section for supplying the compressed air. In the case illustrated, such port section is formed as an air injector for use in inflating tire tubes. The sections 1 and 4 and sections 4 and 11 are connected by high pressure tubes such as high pressure rubber hoses 12. If necessary, a connecting tube 13 can be arranged in front of the sleeve section 1. Also an air holder (not shown) can be arranged before or after the filter section 4.

In the tip 14 of the sleeve section 1, there is provided with a screw formation to be connected to a hole such as a plug hole of an engine cylinder. Under the outer air inlet port 2, there are provided with an outer air inlet valve 15 which opens according to the variation of the cylinder pressure, and a check valve 3 which prevents the reverse flow of the compressed gas.

The filter section 4 is composed of the filter chamber 6 and the gas detector 9. In the filter chamber 6, there is provided with a gas flow regulator as shown in FIGURE 3, and an adsorbent as will be explained hereinafter. The gas flow regulator comprises a plurality of regulating plates 8 mounted around a supporting rod 7 at appropriate intervals in staggered relation. In the regulator shown in FIGURE 3, four semi-circular regulating plates are fixed to the supporting rod with a staggering angle of 90°. The fixed parts of the plates are somewhat bent and said parts are fitted to the rod to form a right angle with each other. By this arrangement, the special technical merits as explained hereinafter will be attained. The gas detector 9 is composed of a transparent tube 10 filled with gas detecting agent and a protecting tube covering the transparent tube 10, and is connected to the end of the filter chamber 6. As the gas detecting agent, a compound which changes its colour by the presence of hydrocarbons, such as ammonium molybdate $(NH_4)_2MoO_4$ and a catalyst such as palladium sulfate $PdSO_4$ are used.

In order to prevent any intrusion of outer air into the filter chamber, cocks 16 are provided upstream and downstream of the chamber, and the front and back end faces of the filter chamber are covered by screens 17 and filters 18 such as polyuretane foam filters.

The apparatus specifically explained in the above is applicable to various sorts of fuels and internal combustion engines which have compression stroke, the mounting and function of the apparatus will be explained hereinafter with a usual four cycle gasoline engine of automobile, for convenience of explanation.

FIGURES 4 and 5 are explanatory schematic views showing the apparatus of this invention mounted to a cylinder of a gasoline engine, wherein a cylinder 19, a piston 20, a gas intake valve 21, an exhaust valve 22, a crank connecting rod 23, a plug insertion hole 24, and a plug 25 are shown.

For utilizing the gas mixture of gasoline and air compressed in the compression stroke of such engine, the tip of the sleeve section 1 of this apparatus is screwed into the plug hole 24 after unscrewing the plug 25. In order to fit to various diameters of the hole 24, connecting tubes 13 having various diameters are prepared. When the engine is initiated, the gas intake valve 21 of the cylinder and the outer air intake valve 15 of this apparatus are opened. The gas mixture of gasoline and air mixed in the carburetor in a volume ratio of 1:50 from the valve 21 and at the same time the outer air from the intake port 2 are introduced into the cylinder. Thus, the gasoline in the gas mixture is diluted within about 10 p.p.m. The diluted mixture is then compressed to about ⅛ volume ratio in the compression stroke and sent to the filter chamber 6 of the filter section 4 through the sleeve section 1. When the piston reaches to the upper dead point, the check valve 3 of the sleeve section 7 is closed and the exhaust valve 22 of the cylinder 19 is opened. Then the outer air introduced from the outer intake valve 2 is exhausted from the exhaust valve 22 through the cylinder. On the other hand, the diluted gas mixture introduced into the filter chamber 6 is brought into contact with the adsorbent 5.

After the gasoline is adsorbed by the adsorbent 5, the mixture, which is now safe and harmless compressed air, is supplied from the supply port section 11 through the high pressure tube 12 for any desired purpose.

In the case of FIGURE 4, the sleeve section 1 is screwed into the plug hole 24 of the cylinder. It may be practicable to provide a separate hole in the cylinder by drilling in the manufacture of the engine when the construction of the engine allows it, as shown in FIGURE 5. In such an arrangement, the plug current must be cut before starting the operation of this appratus.

If the normal function of the carburetor and the outer air intake valve 15 of the sleeve section are always assured, it is of course harmless to use the diluted gas mixture directly for inflating the tire tube. However, if any failure takes place in any mechanism, particularly in the outer air intake valve of the apparatus, the dense gas mixture which is within the critical range of explosion will be sent into the tire tube. This is very dangerous as explained before. By this invention, such fear is completely removed by the double precaution, that is the adsorbtion of gasoline, and its confirmation by the detector.

Further, the filter chamber of this apparatus has excellent filtrating ability since the gas flow regulator shown in FIGURE 3 is provided therein. Without such gas flow regulator, the speed of gas flowing the filter chamber becomes considerably high, and the gas flows straightly from inlet to outlet. Under this condition, only a part of the gas is adsorbed by the adsorbent since the chances of contact are not so much. By using the flow regulator the gas flow will change its direction as it hits the regulating plates, as shown by arrows in FIGURE 2, and will pass evenly throughout the chamber, enabling to increase chances of contact with the adsorbent and therefore to increase the adsorbing efficiency.

A part of the filtrated gas is sent to the transparent detector tube connected at the end of the filter chamber. The color of the detecting agent contained in the tube is light brown so far as hydrocarbons do not exist. If gasoline remains in the filtrated gas, the color changes to dark green. By observing this change of color the failure in construction or effectivity of the adsorbent can be easily determined.

Or more concretely, the change to dark green of all the adsorbent of the illustrated embodiment shows the flowing of hexane of 0.6 vol. percent, and a half life time of the activated carbon used as adsorbent was passed.

The sorts of the adsorbent which can be used, is for example activated carbon, silica gel, activated alumina, molecular sieve and so on. Activated carbon is considered most practical.

The filtrating effects of various ingredients by the apparatus of this invention are illustrated in the following data of gas chromatographical analysis:

| Stationary phase | Sample | |
|---|---|---|
| | Raw gas 350 ml.[1] | Raw gas plus air 300 ml.[2] |
| | Tricresyl phosphate | Tricresyl phosphate |
| Column temp., °C | 50.0 | 70.5 |
| Carrier gas | $H^2$ | $H^2$ |
| F.ow rate, ml./min | 50 | 63 |
| Cell current, ma | 270 | 270 |
| Ingredients, vol. percent: | | |
| iso-Butane | $3.8 \times 10^{-2}$ | $4.6 \times 10^{-5}$ |
| n-Butane | $1.2 \times 10^{-1}$ | $1.3 \times 10^{-4}$ |
| iso-Pentane | $1.3 \times 10^{-1}$ | $8.6 \times 10^{-5}$ |
| n-Pentane | $1.6 \times 10^{-1}$ | $8.9 \times 10^{-5}$ |
| 2-methyl-pentane | $7.4 \times 10^{-2}$ | $4.6 \times 10^{-5}$ |
| 3-methyl-pentane | $7.2 \times 10^{-2}$ | $4.3 \times 10^{-5}$ |
| n-Hexane | $9.6 \times 10^{-1}$ | $6.7 \times 10^{-5}$ |
| 2-methyl-hexane | $3.6 \times 10^{-2}$ | |
| 3-methyl-hexane | $6.4 \times 10^{-2}$ | |
| n-Heptane | $3.5 \times 10^{-1}$ | |

[1] The raw gas is drawn from a cylinder before its explosion and has a consistency within the explosion critical range (1.4–7.6 vol. percent).
[2] The raw gas as referred to in the above remarks is diluted by the apparatus of this invention up to 10 p.p.m.

After the raw gas shown in the above first column has been filtrated by the apparatus of this invention, no hydrocarbons could be detected (critical value of the quantitative analysis: 1 p.p.m.; the volume of the sample: 3 liters).

After the mixture of raw gas and air as shown in the above second column has been filtrated by the apparatus, no hydrocarbons could be detected (critical value of the quantitative analysis 0.1 p.p.m.; the volume of the sample: 20 liters).

As proven by the above data, it can be assured that the gasoline is reduced below 1 p.p.m. by the filtration of this apparatus even if a gas mixture within the explosion range were supplied to the apparatus in any failure of mechanism, such as the failure of the outer air intake valve. Thus, safe and harmless compressed air is supplied.

The life time of the apparatus (length of the filter chamber 240 mm., inner diameter 43 mm., activated carbon 150 g.) is 8000 hours when it is mounted on a cylinder of a four cycle-engine of 90 HP and 1900 cc. and is continuously operated on an idling condition. The volume of air to be obtained is 59,904,00 liters (normal pressure). This volume is sufficient to inflate about 1,300,000 tires of standard passenger automobiles at the compressed air of 241 lbs./in.²

Although the principal purpose of the present apparatus is the inflation of automobile tire tube as explained in the above, the apparatus can be utilized various other purpose such as air cleaners, coating material sprayers, water sprayers for car washing, rotary puffs, nut drivers, and turning saws.

It is evident that various modifications and changes may be made in the embodiment of the invention herein

What I claim is:

1. An apparatus for supplying compressed air into tire tubes by the utilization of the compression stroke of an internal combustion engine, comprising a compressed gas intake pipe section having an outer air inlet port and a check valve; a filtrating section having a filter chamber containing adsorbent and a flow regulator composed of a plurality of regulating plates mounted around a supporting rod at appropriate intervals in staggered relation, and a gas detector having a transparent tube filled with gas detecting agent and communicating with the end of said filter chamber; and a compressed air supply port section; these sections being connected one another by means of high pressure hoses.

2. An apparatus as claimed in claim 1, wherein said adsorbent is selected from a group comprising activated carbon, silica gel, activated alumina and molecular sieve.

3. An apparatus as claimed in any of claims 1 and 2, wherein gas detector comprises ammonium molybdate and palladium sulfate.

References Cited

UNITED STATES PATENTS

| | | | |
|---|---|---|---|
| 753,568 | 3/1904 | Girard | 123—198 |
| 1,621,179 | 3/1927 | Surlemont | 123—198 |
| 2,029,216 | 1/1936 | Barker | 123—41.86 |
| 2,115,435 | 4/1938 | Tanner | 123—198 |
| 1,734,292 | 11/1929 | Gonzalez | 123—198 |
| 1,912,589 | 6/1933 | Muehl | 123—198 |

WENDELL E. BURNS, *Primary Examiner.*